Patented July 30, 1940

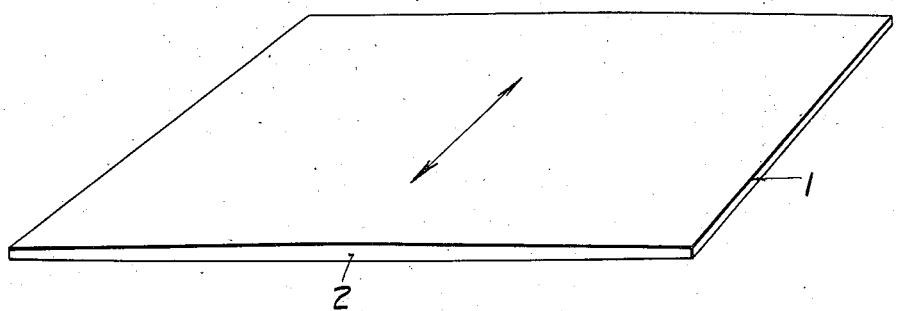
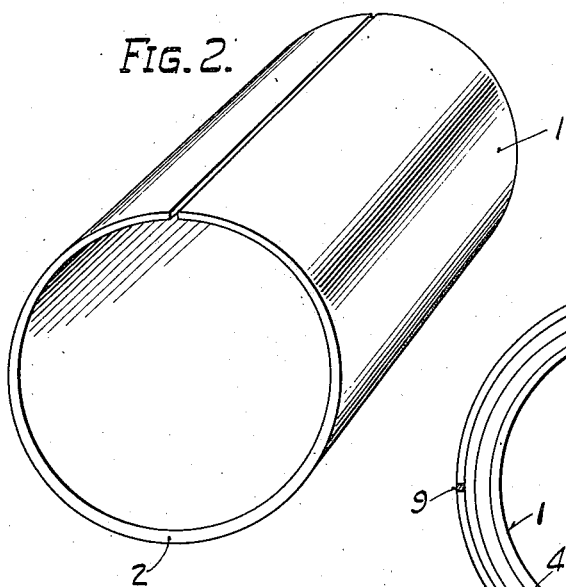
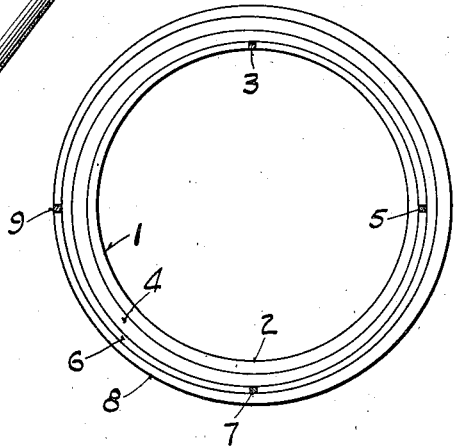

2,209,402

UNITED STATES PATENT OFFICE 2,209,402

METHOD OF MAKING PRESSURE VESSELS

William R. Kepler, Wauwatosa, Wis., assignor to A. O. Smith Corporation, Milwaukee, Wis., a corporation of New York Application May 7, 1938, Serial No. 206,529

6 Claims. (Cl. 29—148.2)

This invention relates to a method of making pressure vessels of the type disclosed in United States Letters Patent No. 1,925,118 issued to Richard Stresau. Vessels of this character are made from a number of layers of plate material shaped into cylindrical form and fused together. By building up a number of layers in the manner described in the Stresau patent, a vessel is created capable of withstanding tremendously high internal pressures.

One of the difficulties encountered in manufacturing vessels of this character arises from the fact that the plate metal which is used in forming the layers frequently has a crown in the center due to the rolling operation performed at the steel mill. The unevenness of thickness in plate stock becomes cumulatively greater when the plates are built up in a layer vessel and although at the middle of the ring section, the separate layers may be drawn into relatively close contact, at the outer edges and adjacent the circumferential joints, the layers will be spaced apart rendering it extremely difficult to draw the layers tightly together to assure proper stress distribution under working conditions.

It is an object of the present invention to provide a method of forming the plates which come from the steel mill and disposing them around the shell of a multi-layer vessel in such a manner that the layers may be brought into uniform tight engagement for welding and fabrication.

Reference is made to the accompanying drawing in which

Figure 1 is a perspective view of a plate having an exaggerated crown in the central portion;

Fig. 2 is a perspective view of the plate after it is formed into a tubular section according to this invention; and Fig. 3 is an end view of a shell section composed of a number of layers formed in the same manner as the plate shown in Fig. 2 and relatively disposed to compensate for the crowned portion.

It has been customary in the fabrication of heavy walled pressure vessels to form cylindrical sections by rolling the plates in the same direction in which they have been rolled in the mill. As a result, the grain of the steel is worked in the direction in which the greatest stresses occur. In a multi-layer vessel, where wall thickness is created by the use of a number of layers of relatively thin plates, the plates need not be formed so that the grain is worked circumferentially but the working at the steel mill may be disposed longitudinally of the shell section.

According to the present invention, the plate I shown in Fig. 1, having a crown 2 in the central portion is formed in the shop into cylindrical shape as shown in Fig. 2. Where forming is accomplished by rolling, the rolling operation is at right angles to the direction of rolling in the steel mill and results in the formation of a tubular member having a crown the extent of which is substantially uniform for the length of the tubular member.

After welding the seam 3, the next layer 4 is formed in the same manner as the plate I with the crown extending longitudinally of the tubular members. The plate forming layer 4 is then disposed around the plate I, but with its longitudinal seam 5 spaced from the longitudinal seam 3 of plate I in order that the crown in layer 4 may be offset with respect to the crown in plate I. Pressure is applied to draw the layer 4 into tight engagement with plate I in which position they are both maintained during welding.

The same procedure is followed in forming outer layers 6 and 8 and in spacing seams 7 and 9. By spacing the longitudinal seams 3, 5, 7 and 9 at angles of 90°, a total wall thickness of substantial uniformity will be created. Still more additional layers may be applied until a vessel of the desired wall thickness is obtained.

In Fig. 3, the seams are shown spaced at angles of 90° but spacing at different angles may be employed depending upon the number of layers, the size of the crown and the degree of taper from the center of the crown to the edges of the plate. In certain instances, it may be desirable to have the longitudinal seams coincide. This arrangement is not as desirable as the spaced arrangement because the shell thickness at the other side of the vessel will be cumulatively increased with each layer. The plates however may still be brought uniformly together.

In the drawing, the amount of crown, or increased thickness of the plate, is exaggerated to illustrate the application of the present invention. In actual practice the amount of the crown may only be a few thousandths of an inch, but in vessels having a considerable number of layers, the cumulative effect of this increased thickness raises a serious manufacturing obstacle. By the method here disclosed this obstacle is effectively overcome.

What is sought to be secured by Letters Patent is:

1. The method of making pressure vessels having a number of layers of relatively thin plate material formed into tubular shape which comprises forming tubular layers from plate stock which has been rolled in a direction longitudinally of the formed tubular members, disposing said layers in concentric relation with the thin or edge portions compensating for the crown in the plates caused by the rolling operation and welding them together in close nesting engagement.

2. The method of manufacturing pressure vessels having a number of layers of relatively thin plate material formed into tubular shape and fused together, which comprises forming tubular layers from plate stock which has been rolled in a direction longitudinally of the formed tubular member and has a central crown resulting from the rolling operation, and disposing and welding the longitudinal seams between the meeting edges of the tubular formed plate members at circumferential positions which compensate for the crown at the central portion of the plate.

3. The method of manufacturing multi-layer pressure vessels from plates formed into tubular shape and fused together, which comprises rolling the plate material into tubular form, said rolling operation being performed at right angles to the direction in which the plates were rolled at the mills, and disposing the tubular members concentrically of each other but with seams circumferentially spaced to compensate for the crown at the center of the plates caused by the rolling operation in the mill and to provide a vessel having a wall thickness substantially uniform at all points of the circumference and throughout the length of the cylindrical section.

4. A multi-layer pressure vessel having a number of concentrically arranged tubular members formed from plates having a crown in the central portion extending longitudinally thereof, said tubular members having welded longitudinal joints closing the tubular members in close engagement with each other, the crowns of the respective plates being spaced circumferentially to compensate for each other and provide a vessel of substantially uniform wall thickness throughout the length and circumference of the vessel.

5. A multi-layer pressure vessel having a number of concentrically arranged tubular members formed from plates having a crown in the central portion extending longitudinally thereof, said tubular members having welded longitudinal joints opposite said crown, the joints for different plates being circumferentially spaced to compensate for the increased thickness of the plates caused by the crowns.

6. A multi-layer pressure vessel having a number of concentrically arranged tubular members formed from plates having a crown in the central portion extending longitudinally thereof, said tubular members having welded longitudinal joints closing the tubular members in close engagement with each other, the crowns of the respective plates being spaced circumferentially to compensate for each other and provide a vessel of substantially uniform wall thickness throughout the length and circumference of the vessel.

WILLIAM R. KEPLER.